United States Patent
Kamble et al.

(10) Patent No.: US 9,461,938 B2
(45) Date of Patent: *Oct. 4, 2016

(54) LARGE DISTRIBUTED FABRIC-BASED SWITCH USING VIRTUAL SWITCHES AND VIRTUAL CONTROLLERS

(75) Inventors: Keshav G. Kamble, Fremont, CA (US); Dar-Ren Leu, San Jose, CA (US); Uday S. Nagaraj, Sunnyvale, CA (US); Santosh Rajagopalan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 488 days.

This patent is subject to a terminal disclaimer.

(21) Appl. No.: 13/477,947

(22) Filed: May 22, 2012

(65) Prior Publication Data
US 2013/0315233 A1 Nov. 28, 2013

(51) Int. Cl.
*H04L 12/50* (2006.01)
*H04L 12/937* (2013.01)
*H04L 12/931* (2013.01)

(52) U.S. Cl.
CPC ............. *H04L 49/254* (2013.01); *H04L 49/70* (2013.01)

(58) Field of Classification Search
USPC ....... 370/252, 254, 256, 396–399, 401, 422, 370/463
See application file for complete search history.

(56) References Cited

U.S. PATENT DOCUMENTS

| | | | |
|---|---|---|---|
| 7,849,127 B2 | 12/2010 | Lindem, III et al. | |
| 8,000,266 B2* | 8/2011 | Bulusu et al. ................ | 370/256 |
| 8,054,832 B1 | 11/2011 | Shukla et al. | |
| 8,103,853 B2 | 1/2012 | Ramesh et al. | |
| 2002/0103921 A1* | 8/2002 | Nair et al. ..................... | 709/232 |
| 2003/0093541 A1 | 5/2003 | Lolayekar et al. | |
| 2003/0130832 A1 | 7/2003 | Schulter et al. | |
| 2008/0144533 A1* | 6/2008 | Bulusu et al. ................ | 370/256 |
| 2009/0292858 A1 | 11/2009 | Lambeth et al. | |
| 2010/0011356 A1 | 1/2010 | Nance et al. | |
| 2010/0039932 A1 | 2/2010 | Wen et al. | |
| 2010/0214949 A1 | 8/2010 | Smith et al. | |
| 2010/0257263 A1 | 10/2010 | Casado et al. | |

(Continued)

FOREIGN PATENT DOCUMENTS

| | | |
|---|---|---|
| WO | 2010096155 A1 | 8/2010 |
| WO | 2011130423 A1 | 10/2011 |

OTHER PUBLICATIONS

U.S. Appl. No. 13/850,230, filed Mar. 25, 2013.

(Continued)

*Primary Examiner* — Yemane Mesfin
*Assistant Examiner* — Mon Cheri Davenport
(74) *Attorney, Agent, or Firm* — Zilka-Kotab, PC

(57) ABSTRACT

In one embodiment, a system includes at least one distributed line card (DLC) in electrical communication with at least one switch fabric coupler (SFC) and a meta-controller in electrical communication with the at least one DLC, the meta-controller including a processor for executing logic, logic configured for creating more than one virtual switch and a corresponding virtual control domain (VCD) associated with each virtual switch, wherein each virtual switch includes a plurality of physical ports of one or more of the at least one DLC, and logic configured for autonomously controlling the virtual switches, wherein the system appears to a device external of the system as a single cell switched domain. Other systems are described according to more embodiments.

20 Claims, 5 Drawing Sheets

(56) References Cited

U.S. PATENT DOCUMENTS

2011/0238816 A1     9/2011   Vohra et al.
2013/0315234 A1*   11/2013   Kamble et al. ............... 370/385

OTHER PUBLICATIONS

Yoshigoe, K., "The CICQ Switch with Virtual Crosspoint Queues for Large RTT," IEEE ICC, Jun. 2006, pp. 299-303.

Goossens et al., "Internet-Router Buffered Crossbars Based on Network on Chips," CNSR 2010, May 2010, pp. 74-79.

Office Action from German Application No. 102013208431.5, dated Nov. 28, 2014.

Non-Final Office Action from U.S. Appl. No. 13/850,230, dated Feb. 20, 2015.

Mhamdi et al., "Buffered Crossbar Fabrics Based on Networks on Chip," Communication Networks and Services Research Conference, Eighth Annual CNSR, May 11-14, 2010, pp. 74-79.

Final Office Action from U.S. Appl. No. 13/850,230, dated Sep. 14, 2015.

Non-Final Office Action from U.S. Appl. No. 13/850,230, dated May 2, 2016.

Notice of Allowance from U.S. Appl. No. 13/850,230, dated Jul. 7, 2016.

* cited by examiner ional scaling issues. Further, particular features described herein can be
LARGE DISTRIBUTED FABRIC-BASED SWITCH USING VIRTUAL SWITCHES AND VIRTUAL CONTROLLERS

BACKGROUND

The present invention relates to data center infrastructure, and more particularly, this invention relates to a distributed fabric-based switch which uses virtual switches and virtual controllers.

A distributed fabric-based switch is capable of having a large number of ports, e.g., more than 5000 ports, in some cases. In order to achieve this number of ports, the distributed fabric-based switch comprises many smaller switches, hereafter referred to as Distributed Line Cards (DLCs), each having front panel ports, which are interconnected with other DLCs using a cell-based Clos interconnect system. The Clos fabric is capable of switching cells using information included in the cells from a lookup at a first DLC. The advantage of such a system is that a large number of switches and ports may be scaled to without adding overhead of additional route lookups at each stage of the hierarchy. Instead, the lookup is performed at the first DLC.

However, on the flip side, there is now a large number of ports that need to be managed by a single controller. This presents immense scalability problems for the controller software. Most existing solutions (e.g., Juniper Network's QFabric) try to resolve this problem by restricting the number of ports that routing protocols are allowed to run on. However, even when this solution is implemented, there are still scaling issues for other software, applications, and routines that utilize port knowledge of the switch beside the routing protocols which are not addressed by the existing solutions.

SUMMARY

In one embodiment, a system includes at least one distributed line card (DLC) in electrical communication with at least one switch fabric coupler (SFC) and a meta-controller in electrical communication with the at least one DLC, the meta-controller including a processor for executing logic, logic configured for creating more than one virtual switch and a corresponding virtual control domain (VCD) associated with each virtual switch, wherein each virtual switch includes a plurality of physical ports of one or more of the at least one DLC, and logic configured for autonomously controlling the virtual switches, wherein the system appears to a device external of the system as a single cell switched domain.

Other aspects and embodiments of the present invention will become apparent from the following detailed description, which, when taken in conjunction with the drawings, illustrate by way of example the principles of the invention.

DETAILED DESCRIPTION

Figure 1:
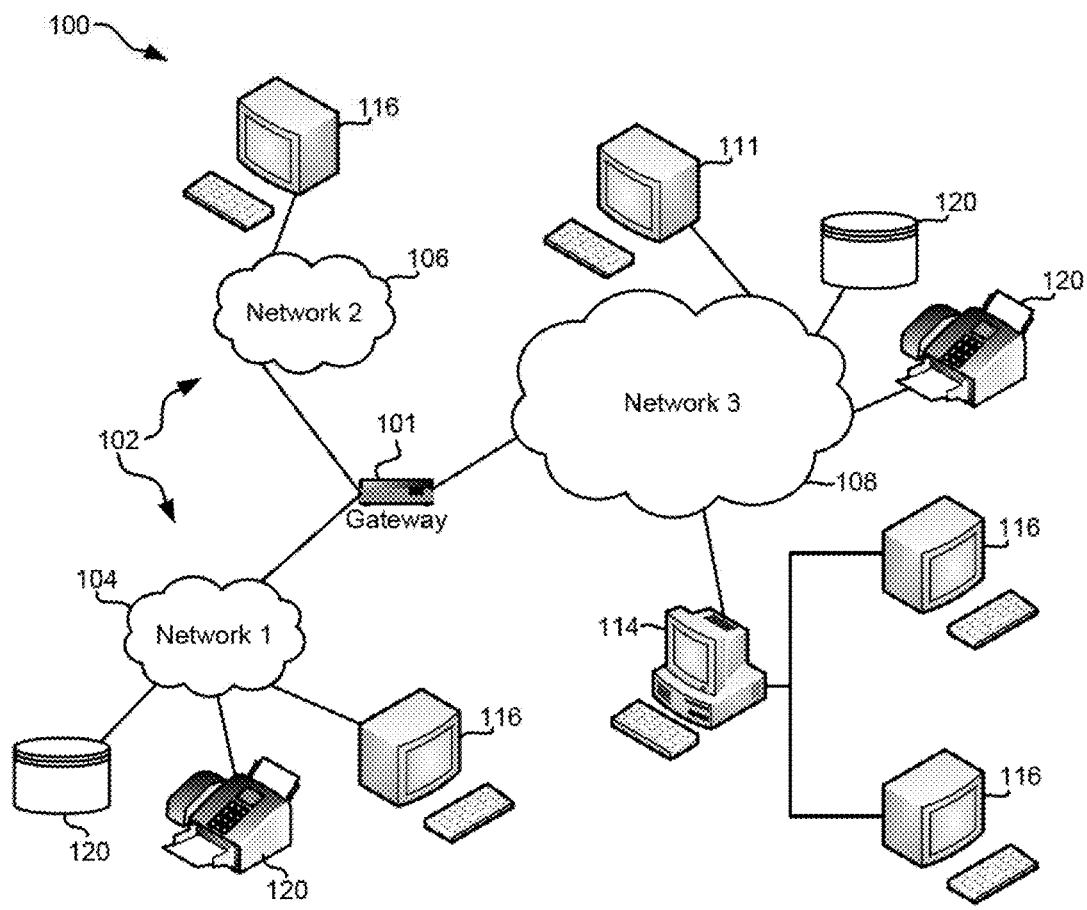
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, the ports in a distributed switch may be split among a number of "virtual switches." Each such virtual switch may have a "virtual controller" associated therewith. A "meta"-controller, which is aware of the virtual switches and virtual controllers, may interconnect the virtual controllers in a virtual, full-mesh fashion.

According to an alternative approach, when a network administrator chooses or prefers for the switches to not be visible to each other, these virtual links may be hidden from the switches. Control protocol instances running in these virtual controllers may have a virtual full-mesh of connectivity with the other control protocol instances running in the other virtual controllers. The meta-controller may also take care of replacing these virtual links in routes with actual links. These virtual controllers may be migrated to physically separate servers to mitigate scalability issues. The meta-controller takes care of filtering the port events and received control packets. In this way, the system retains the one-hop lookup benefit of a distributed switch but may be scaled to be much larger.

In one general embodiment, a system includes at least one distributed line card (DLC) in electrical communication with at least one switch fabric coupler (SFC) and a meta-controller in electrical communication with the at least one DLC, the meta-controller including a processor for executing logic, logic configured for creating more than one virtual switch and a corresponding virtual control domain (VCD) associated with each virtual switch, wherein each virtual switch includes a plurality of physical ports of one or more of the at least one DLC, and logic configured for autonomously controlling the virtual switches, wherein the system appears to a device external of the system as a single cell switched domain.

In another general embodiment, a method includes splitting a plurality of physical ports distributed across multiple DLCs into a plurality of virtual switches, wherein each virtual switch includes ports of one or more DLC, creating a VCD associated with each virtual switch, and autonomously controlling the virtual switches, wherein each DLC is in electrical communication with at least one SFC, and the plurality of physical ports appear to external devices as being part of a single cell switched domain.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C." programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention.

It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
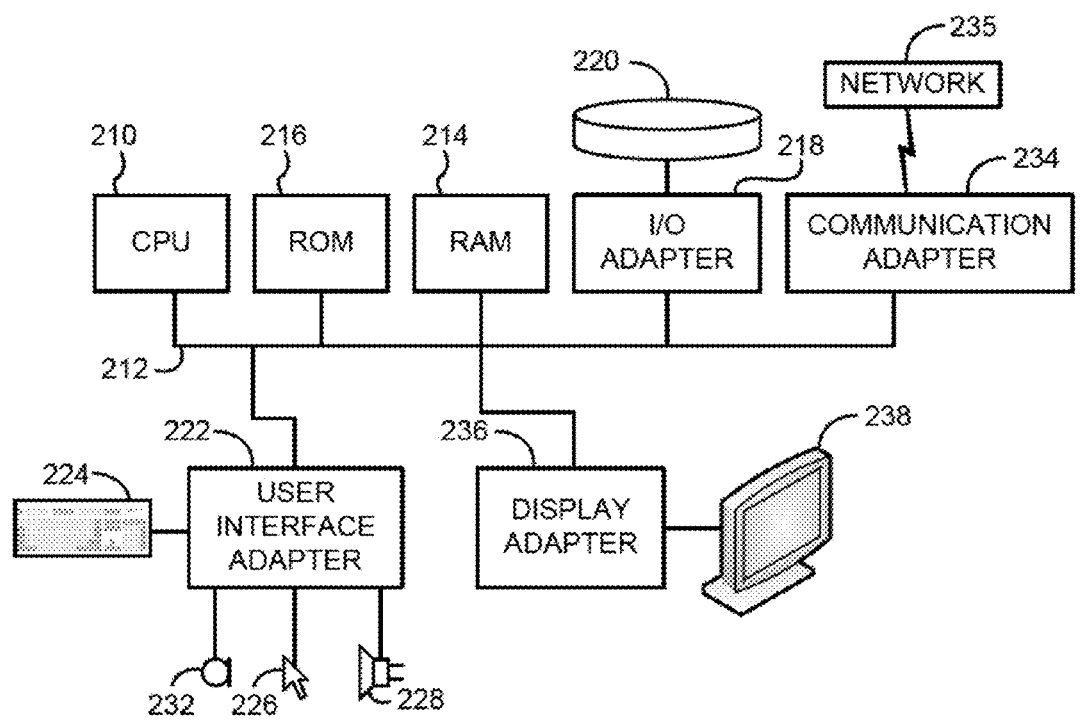
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Currently, methods of achieving interconnectivity between a large number of layer 2 ports rely on having numerous discrete switches each running spanning tree protocol (STP) or transparent interconnect of lots of links (TRILL). Unfortunately, by using discrete switches, a lookup needs to be performed using a lookup table at each hop between two of the discrete switches, which not only adds latency to the process, but also makes the process latency unpredictable as the network evolves and changes.

On the other hand, distributed switches relying on a cell-based fabric interconnect have an advantage of providing predictable, low latency for setups in which interconnectivity between a large number of ports is desired. A distributed switch appears to be a single, very large switch, with the single ingress lookup specifying the index needed to traverse the network. The edge facing switches are interconnected using cell-based clos fabrics, which are wired in a fixed fashion and rely on the path selection made at the ingress.

Unfortunately, as the number of ports in a distributed switch grows, software that manages the network must struggle to accommodate the increased number of link up and/or link down events (link events) and processing. Control protocols, like STP and intermediate system to intermediate system (ISIS), will see a large number of link events, which will stress their convergence times if they continue to exist as monolithic elements.

Figure 3:
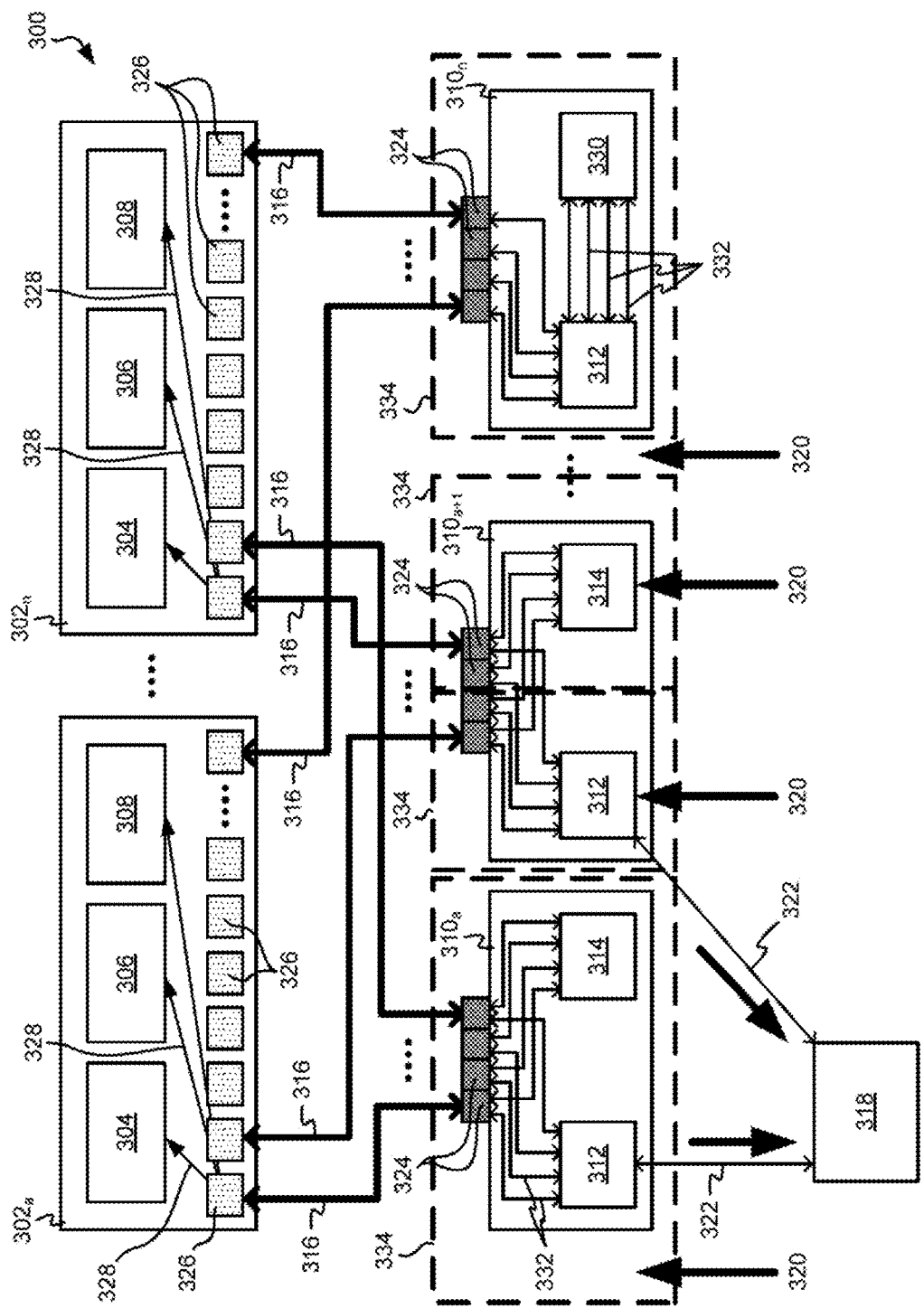
FIG. 3 is a simplified diagram of a distributed switch system, according to one embodiment.

Now referring to FIG. 3, a distributed switch system 300 is shown according to one embodiment. The distributed switch system 300 may include a plurality of SFCs $302_a$-$302_n$ and a plurality of DLCs $310_a$-$310_n$. The system 300 is formed by having a plurality of DLCs $310_a$-$310_n$ directly connected to SFCs $302_a$-$302_n$ via connections 316. A plurality of network data packets or control protocol data units (PDUs) 320, for example PDUs from various network ports, may be received by the DLCs $310_a$-$310_n$, possibly numbering in the billions. In addition, the DLCs $310_a$-$310_n$ may be in communication with the meta-controller 318 via a plurality of connections 322 to exchange information, data, statuses, etc.

According to various embodiments, the connections 316 may be a bundle of 12 links each with 10 G to 11 G bandwidth. The bundle may use a standard connector form factor. In more embodiments, the plurality of connections 322 may comprise any suitable connection, such as peripheral component interconnect express (PCIe), gigabit Ethernet, XAUI, etc.

In one embodiment, for example, the meta-controller 318 may be configured with logic capable of receiving incoming data traffic, controlling PDU traffic, and processing all the packets for the control plane of the distributed switch system 300.

In various embodiments, each SFC $302_a$-$302_n$ may be further characterized as described below. First, each SFC $302_a$-$302_n$ may include a plurality of module boards 304, 306, 308. In one embodiment, the module boards 304, 306, 308 may include any suitable module board according to the understanding of the skilled artisan reading the present descriptions. The SFCs $302_a$-$302_n$ may include a plurality of ports (or interfaces) 326, with each SFC port 326 being in communication with each of the module boards 304, 306, 308 via connections 328. Moreover, the SFC ports 326 may be capable of interfacing, for example, with DLCs $310_a$-$310_n$ via connections 316.

As shown in FIG. 3, each SFC $302_a$-$302_n$ includes 32 of such SFC ports 326, but of course other embodiments may include more or less SFC ports 326 for each SFC $302_a$-$302_n$, such as 8, 16, 64, 128, etc. In one particular embodiment, for example, the SFCs $302_a$-$302_n$ include 256 of such SFC ports 326. In any event, each SFC/DLC includes at least n ports/interfaces, respectively, where n is the number of DLCs $310_a$-$310_n$ included in the distributed switch system 300.

Additionally, the DLCs $310_a$-$310_n$ may be further characterized as follows. Each DLC (except the final DLC $310_n$ which is described immediately below, according to one approach) may include a plurality of switching complexes 312, 314, in one embodiment, such as a plurality of BROADCOM Corporation BCM88650 switches. In one approach, the switching complexes may be Ethernet switching complexes. In addition to the switching complexes 312, 314, each DLC $310_a$-$310_n$ includes a plurality of ports/interfaces 324 capable of facilitating communications between the DLC $310_a$-$310_n$ and any connected peripheral device or component, such as but not limited to one or more SFCs $302_a$-$302_n$, in one approach. In one embodiment, each switching complex 312, 314 may be in communication with each of the DLC ports 324 via independent connections 332. Therefore, according to one embodiment, each switching complex 312, 314 may include n connections 332, one for each of the n DLC ports 324 in the DLCs $310_a$-$310_n$.

Further still, the final DLC (end of rack, top-of-rack, etc.) in any given DLC series, denoted by DLC $310_n$, may have properties unique from the other DLCs $310_a$-$310_{n-1}$ in the series. In particular, whereas DLCs $310_a$-$310_{n-1}$ include a pair of switching complexes 312, 314, the final DLC $310_n$ may alternatively contain a single switching complex 312 in communication with each of the DLC ports 324 via individual connections 332 and a network processing unit (NPU) complex 330 in communication with the switching complex 312 via connections 332, according to one approach. In operation, NPU complex 330 may provide virtual appliance and/or application services, such as firewall services, IPS, IDS, VPN, encryption, etc., as would be understood by one having ordinary skill in the art upon reading the present descriptions.

In one embodiment, connections 316 may be established between DLC ports 324 in the DLCs $310_a$-$310_n$ and SFC ports 326 in the SFCs $302_a$-$302_n$. Moreover, the DLC ports 324 may be SERDES interfaces, and each connection 316 may be characterized as including about 12 SERDES interfaces in DLCs $310_a$-$310_{n-1}$, whereas in DLC $310_n$ each connection 316 may be characterized as including about 6 SERDES interfaces, in one approach.

Notably, each of the SFCs $302_a$-$302_n$ is in communication with each of the DLCs $310_a$-$310_n$ via a single connection 316. Connectivity may be achieved between all SFCs and DLCs according to any connection architecture known in the art. For example, as shown in FIG. 3, connectivity between SFC ports 326 and DLC ports 324 is achieved according to the following relationship, $$SFC_{(S,p)} \leftarrow\!\rightarrow DLC_{(D,i)}; \text{ where } S=i \text{ and } p=D,$$

where S represents the position of the SFC in the SFC series $302_a$-$302_n$, D represents the position of the DLC in the DLC series $310_a$-$310_n$, p represents the port position within the given SFC, i represents the ports position within the given DLC, and $\leftarrow\!\rightarrow$ represents the connection between the two.

In other words, the first port 326 of the first SFC $302_i$ is in communication with the first port 324 of the first DLC $310_i$ via a connection 316. Similarly, the second port 326 of the first SFC $302_i$ [SFC(1,2)] is in communication with the first port 324 of the second DLC $310_{a+1}$ [DLC(2,1)] via a connection 316. This connectivity pattern continues until reaching the last ($n^{th}$) port 326 on the first SFC $302_a$, which is in communication with the first port 324 of the last ($n^{th}$) DLC $310_n$. The second connection of the pair follows an inverse pattern, where the last ($n^{th}$) port 326 of the last ($n^{th}$) SFC $302_n$ is in communication with the last ($n^{th}$) port 324 of the last ($n^{th}$) DLC $310_n$. Furthermore, the penultimate (n-$1^{th}$) port 326 of the last ($n^{th}$) SFC $302_n$ is in communication with the last ($n^{th}$) port 324 of the penultimate DLC $310_{n-1}$. This connectivity pattern continues until reaching the last ($n^{th}$) port 326 of the first SFC $302_a$, which is in communication with the first ($a^{th}$) port 324 of the last DLC $310_n$.

Moreover, the distributed switch system 300 shown in FIG. 3 includes a plurality of SFCs $302_a$-$302_n$ and a plurality of DLCs $310_a$-$310_n$; specifically, the distributed switch system 300 depicts two SFCs and three DLCs. However, as one feature of the distributed switch system 300, the number of SFCs and DLCs may be scaled to achieve any performance characteristics, as desired. In FIG. 3, scalable features include the number of SFCs and the number of DLCs, as well as the number of ports (or interfaces) included on each SFC and/or DLC, as indicated by the ellipsis shown in FIG. 3.

In one approach, the distributed switch system 300 is capable of seamless scaling out to adjust system capabilities to meet processing needs. In particular, the distributed switch system 300 may be configured to automatically incorporate one or more additional peripheral devices into the distributed switch system 300 upon connecting the one or more additional peripheral devices to a device of the distributed switch system 300, and further configured to remove one or more peripheral devices from the distributed switch system 300 upon disconnecting the one or more peripheral devices from a device of the distributed switch system 300.

Seamless scalability may thus be achieved in some approaches by automatically increasing the processing power of the distributed switch system 300 upon incorporation of the one or more additional peripheral devices, or conversely by automatically reducing the processing power of the distributed switch system 300 upon the removal of the one or more peripheral devices, in one embodiment.

Figure 4:
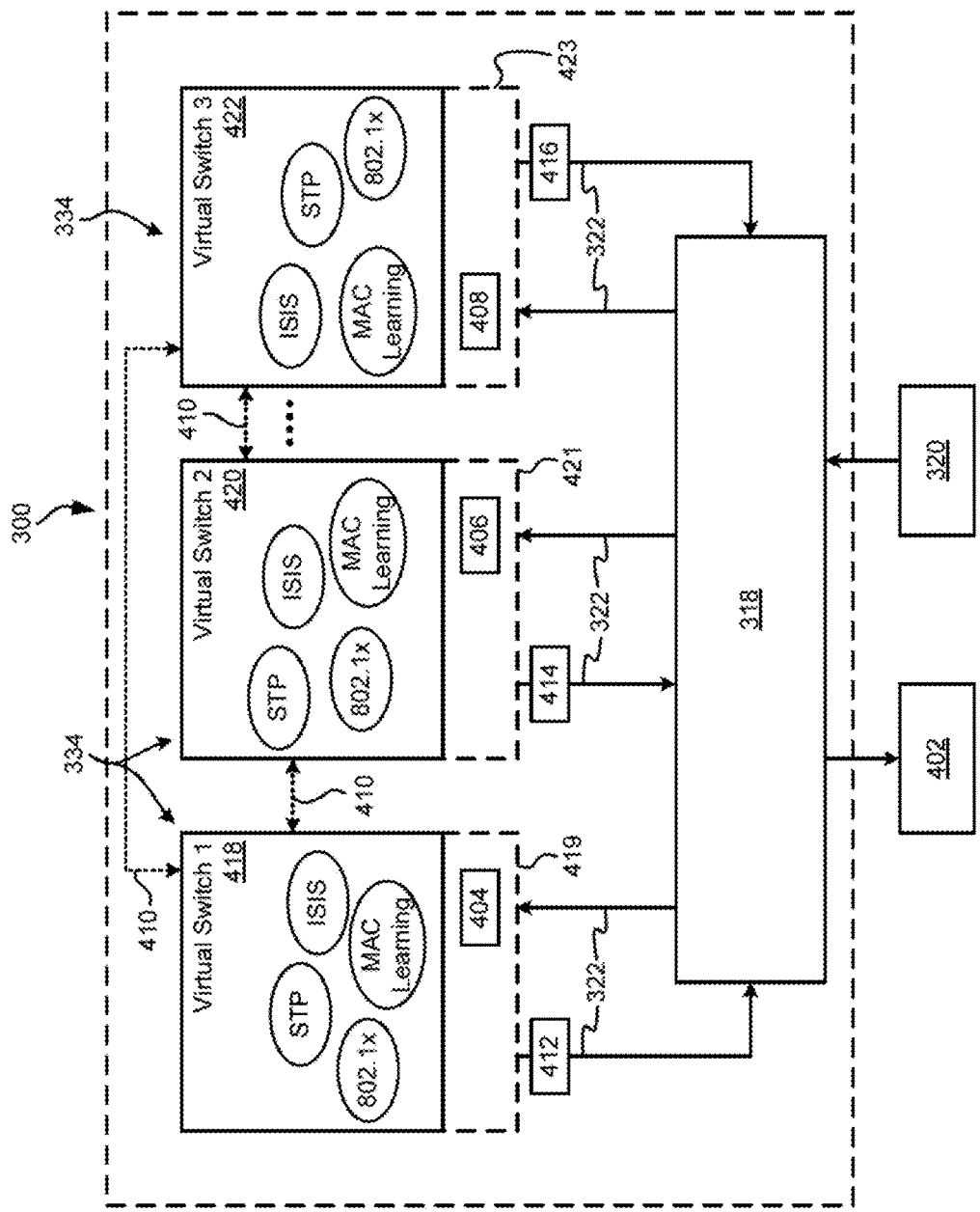
FIG. 4 is a simplified diagram showing virtual switch segregation, according to one embodiment.

Now referring to FIGS. 3-4, according to various embodiments, in order to solve the issues that arise from scaling currently used systems, as described previously, a single distributed switch 300 may be split into a plurality of logical "virtual" switches 334. As shown in FIG. 3, one or more ports 324 from a DLC may be assigned to one or more virtual switches 334, according to one approach.

As shown in FIG. 4, each virtual switch 334 also defines a VCD 419, 421, 423, in accordance with this embodiment. Within each VCD 419, 421, 423, an instance 404, 406, 408 of the control protocols 320 is created. Each of the instances 404, 406, 408 of the control protocols 320 include only link state events and control packets, for example link state packets (LSPs), learning PDUs, etc., for the specific ports that lie within that virtual switch, due to filtering. For example, instance 404 includes link state events and received control packets for ports in virtual switch 1 418, instance 406 includes link state events and received control packets for ports in virtual switch 2 420, instance 408 includes link state events and received control packets for ports in virtual switch 3 422, etc.

This filtering is performed by the meta-controller 318, which relays link state events and control packets 320 to the appropriate VCDs 419, 421, 423. These VCDs 419, 421, 423 may be migrated to physically separate servers, if so desired by a network administrator or some other controlling person, to alleviate processor load on the distributed switch system 300, in one approach. Since the meta-controller 318 receives control protocols 320 only for link state events and PDUs for a subset of the total number of ports in the distributed switch system 300, it is able to provide better convergence times and performance, thereby reducing latency.

In addition, routes and configuration information 412 for ports in virtual switch 1 418 may be sent to the meta-controller 318, routes and configuration information 414 for ports in virtual switch 2 420 may be sent to the meta-controller 318, and routes and configuration information 416 for ports in virtual switch 3 422 may be sent to the meta-controller 318. All of the link state events, control packets, configuration information, etc., may be sent via connections 322 to and from the meta-controller 318.

Connections 322 may be of any suitable type known in the art, such as Ethernet, PCIe, Fiber Channel, etc.

In one embodiment, the meta-controller 318 may create virtual links 410 between the VCDs 419, 421, 423 to give the appearance of full-mesh connectivity between them. This means that control protocols 404, 406, 408 in any given VCD 419, 421, 423, is capable of seeing link up events to their peers in other VCDs 419, 421, 423. The meta-controller 318 may also enable communication between control protocol peers over these virtual links 410, in one approach.

Since these virtual links 410 form a full mesh, the control protocols 404, 406, 408 use these virtual links to establish connectivity with switches that are reached from ports on a different VCD 419, 421, 423. For example, control protocol 404 on virtual switch 1 418 may use a virtual link 410 to establish connectivity with control protocol 408 on virtual switch 3 422.

The route and configuration programming messages from control protocols, e.g., STP adding ports as forwarding in a ULAN or ISIS adding TRILL core ports in the equal-cost multi-path (ECMP) towards a particular switch, are intercepted by the meta-controller 318, which merges the routes/configuration, usually by performing a union of the routes or configuration received from different VCDs 419, 421, 423 and removing any reference to the virtual links 410 used to interconnect the VCDs 419, 421, 423.

For example, if VCD 404 for virtual switch 1 418 has been assigned links interface1 and interface2 (not shown), and VCD 406 for virtual switch 2 420 has been assigned links interface3 and interface4 (not shown), then the virtual link 410 between VCD 404 and VCD 406 is represented in VCD 404 as virtual_interface12 and in VCD 406 as virtual_interface21. Further, if ISIS in VCD 404 adds a route to virtual switch 2 420 with links {interface1, interface2 and virtual_interface12} and ISIS in VCD 406 adds a route towards virtual switch 1 418 with links {interface3, interface4, virtual_interface21}, then the meta-controller 318 will combine these two routes to make a single route between virtual switch 1 418 and virtual switch 2 420 with the links {interface1, interface2, interface3, interface4} and provide that aggregated route and configuration information 402 as requested. In cases where the route or configuration does not contain a reference to the virtual link 410, no such merge is performed.

Note that the meta-controller 318 does not bring up virtual links between the VCDs 419, 421, 423. In particular, if each virtual switch is assigned to a different customer or user group, the default policy on the switch may be to not provide virtual full-mesh connectivity between the switches. This would have the effect of insulting customers or user groups who use different virtual switches from each other. The meta-controller 318 would then not merge routes and configuration from different VCDs 419, 421, 423. A hybrid approach, where some VCDs 419, 421, 423 are interconnected and some are not, is also possible, according to some embodiments.

Figure 5:
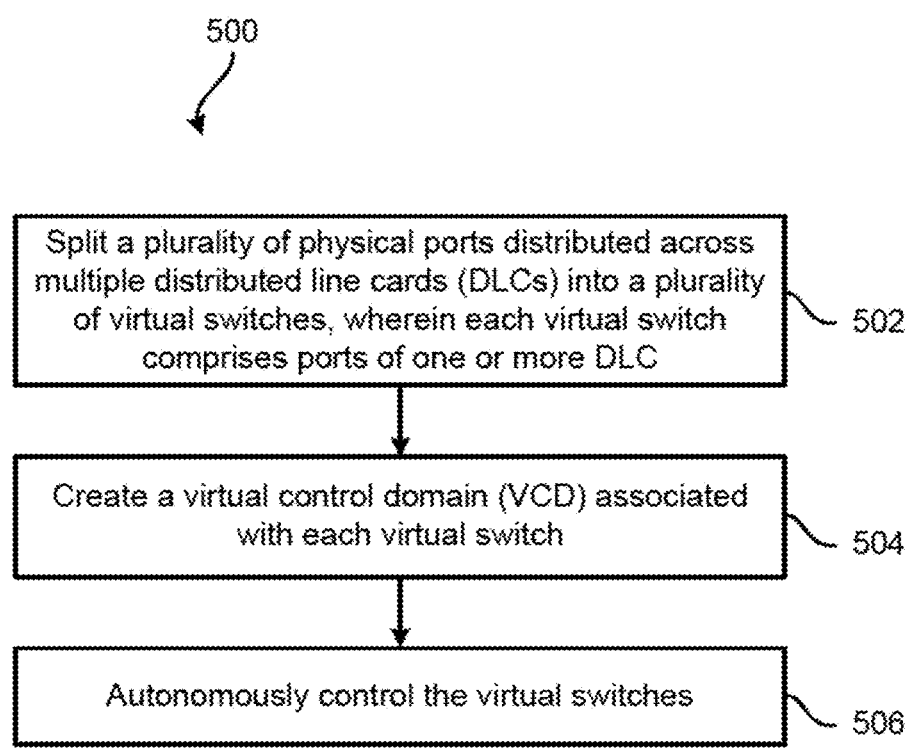
FIG. 5 is a flowchart of a method, according to one embodiment.

Now referring to FIG. 5, a flowchart of a method 500 is shown, according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a meta-controller, as understood herein.

As shown in FIG. 5, method 500 may initiate with operation 502, where a plurality of physical ports distributed across multiple DLCs are split into a plurality of virtual switches, in one approach. In this way, each virtual switch comprises ports of one or more DLC. Of course, the virtual switches may split physical ports of any switching device known in the art, and it is not required that the ports be those of DLCs.

In one approach, each DLC is in electrical communication with at least one SFC, and a meta-controller is in communication with the DLCs. Also, the plurality of physical ports appear to external devices as being part of a single cell switched domain.

In operation 504, a VCD associated with each virtual switch is created. In this way, each virtual switch may be controlled separately using a virtual controller assigned to the individual VCD.

In operation 506, the virtual switches are autonomously controlled, such as by using a meta-controller that intercepts control packets and forwards them to VCDs for which they are related.

In one embodiment, the virtual switches may be autonomously controlled by receiving control packets destined for a physical port of a virtual switch and routing the received control packets to a VCD associated with the virtual switch which comprises the physical port.

In another embodiment, the method 500 may further comprise receiving route and configuration information from the virtual switches and aggregating the route and configuration information for the virtual switches. In this way, each virtual switch and VCD may be completely controlled by a virtual controller assigned thereto.

In one embodiment, the method 500 may further comprise creating virtual links between at least some of the virtual switches, such that these virtual switches may appear to be connected with an inter switch link (ISL), as would be understood by one of skill in the art. This further allows for link aggregation, such as virtual link aggregation (vLAG), between multiple virtual switches, allowing for more bandwidth, reduced latency, etc.

In one embodiment, the method 500 may further comprise mapping virtual instances to virtual resources (which may be related to physical ports of a DLC) to enable two or more virtual switches to share or have overlapping features, such as sharing a physical port, sharing a DLC, etc.

In another embodiment, the method 500 may further comprise generating and distributing multiplexing (mux) and demultiplexing (demux) functionality authentication events across all of the virtual switches. This may be initiated to reduce the processing burden on particular devices in the system.

According to another embodiment, the method 500 may further comprise allowing more than one virtual switch to share a physical port of a DLC and managing conflicts due to the shared physical port. Any conflicts that may occur may be handled by having the meta-controller control flow of events and control packets to and from the virtual switches.

In one embodiment, the method 500 may further comprise segregating the virtual switches into different groups according to a criteria, with the proviso that virtual switches in different groups do not have a virtual link therebetween.

According to various embodiments, the criteria may include, but is not limited to, users, companies, customers, usage, uses, cost, etc.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
    at least one distributed line card (DLC) in electrical communication with at least one switch fabric coupler (SFC); and
    a meta-controller in electrical communication with the at least one DLC, the meta-controller comprising:
        a processor for executing logic;
        logic configured for creating more than one virtual switch and a corresponding virtual control domain (VCD) associated with each virtual switch, wherein each virtual switch comprises a plurality of physical ports of one or more of the at least one DLC;
        logic configured for creating an instance of control protocols within each VCD, the instance of control protocols in each VCD including only link state events and control packets for ports in a virtual switch corresponding to the VCD; and
        logic configured for autonomously controlling the virtual switches;
    wherein the system appears to a device external of the system as a single cell switched domain,
    wherein the at least one SFC comprises a plurality of module boards and a plurality of ports, wherein each port of the plurality of ports of the at least one SFC is in communication with each of the module boards,
    wherein the at least one DLC comprises a plurality of switching complexes and a plurality of ports and/or interfaces configured to facilitate communications between the at least one DLC and a peripheral device and/or component connected thereto, and wherein each switching complex is in communication with each of the plurality of ports and/or interfaces of the at least one DLC via independent connections.

2. The system as recited in claim 1, wherein the meta-controller further comprises:
    logic configured for receiving control packets destined for a physical port of a virtual switch;
    logic configured for routing the received control packets to a VCD associated with the virtual switch which comprises the physical port;
    logic configured for receiving route and configuration information from the more than one virtual switch; and
    logic configured for aggregating the route and configuration information for the more than one virtual switch.

3. The system as recited in claim 1, further comprising a plurality of SFCs and a plurality of DLCs, wherein at least one port of each SFC of the plurality of SFCs is connected to a port of each DLC of the plurality of DLCs.

4. The system as recited in claim 1, wherein the meta-controller further comprises logic configured for creating virtual links between virtual switches to provide full-mesh connectivity between the virtual switches, the full-mesh connectivity allowing control protocols in a VCD to have visibility to link up events to peer control protocols in another VCD.

5. The system as recited in claim 1, wherein the meta-controller further comprises logic configured for mapping virtual instances to virtual resources to enable two or more virtual switches to share or have overlapping features.

6. The system as recited in claim 1, wherein the meta-controller further comprises logic configured for generating and distributing multiplexing and demultiplexing functionality authentication events across all of the virtual switches.

7. The system as recited in claim 1, wherein the meta-controller further comprises:
    logic configured for allowing more than one virtual switch to share a physical port of a DLC; and
    logic configured for managing conflicts due to the shared physical port.

8. The system as recited in claim 1, wherein the meta-controller further comprises logic configured for segregating the virtual switches into different groups according to a criterion, wherein virtual switches in different groups are devoid of a virtual link therebetween, and wherein the criterion is selected from the group consisting of: users, companies, customers, usage, uses, and cost.

9. A computer program product, the computer program product comprising a computer readable storage hardware device having program instructions embodied therewith, the program instructions executable by a meta-controller to cause the meta-controller to:
    create, by the meta-controller, more than one virtual switch and a corresponding virtual control domain (VCD) associated with each virtual switch, wherein each virtual switch comprises a plurality of physical ports of one or more distributed line cards (DLCs), the one or more DLCs being in electrical communication with at least one switch fabric coupler (SFC);
    segregate, by the meta-controller, the more than one virtual switch into groups according to at least one criterion, wherein virtual switches in different groups are devoid of a virtual link therebetween to provide segregation of the virtual switches in the different groups; and
    autonomously control, by the meta-controller, the virtual switches,
    wherein the meta-controller, the one or more DLCs, and the at least one SFC appear to an external device as a single cell switched domain.

10. The computer program product as recited in claim 9, wherein the program instructions are further configured to cause the meta-controller to:
    create an instance of control protocols within each VCD, the instance of control protocols in each VCD including only link state events and control packets for ports in a virtual switch corresponding to the VCD;
    receive control packets destined for a physical port of a virtual switch; and
    route the received control packets to a VCD associated with the virtual switch which comprises the physical port.

11. The computer program product as recited in claim 9, wherein the program instructions are further configured to cause the meta-controller to:
    intercept route and configuration programming messages from control protocols destined toward at least one virtual switch;
    merge route and configuration information from the route and configuration programming messages intercepted from different VCDs; and
    aggregate the route and configuration information for the more than one virtual switch.

12. The computer program product as recited in claim 9, wherein the program instructions are further configured to cause the meta-controller to create virtual links between virtual switches to provide full-mesh connectivity between the virtual switches, the full-mesh connectivity allowing control protocols in a VCD to have visibility to link up events to peer control protocols in another VCD.

13. The computer program product as recited in claim 9, wherein the program instructions are further configured to cause the meta-controller to map virtual instances to virtual resources to enable two or more virtual switches to share or have overlapping features.

14. The computer program product as recited in claim 9, wherein the program instructions are further configured to cause the meta-controller to generate and distribute multiplexing and demultiplexing functionality authentication events across all of the virtual switches.

15. The computer program product as recited in claim 9, wherein the program instructions are further configured to cause the meta-controller to:
allow more than one virtual switch to share a physical port of a DLC; and
manage conflicts due to the shared physical port.

16. The computer program product as recited in claim 9, wherein the at least one criterion is selected from the group consisting of: users, companies, customers, usage, uses, and cost.

17. A meta-controller, comprising a processor and logic integrated with and/or executable by the processor, the logic being configured to cause the meta-controller to:
create more than one virtual switch and a corresponding virtual control domain (VCD) associated with each virtual switch, wherein each virtual switch comprises a plurality of physical ports of one or more distributed line cards (DLCs), the one or more DLCs being in electrical communication with at least one switch fabric coupler (SFC);
autonomously control the virtual switches; and
generate and distribute multiplexing and demultiplexing functionality authentication events across all of the virtual switches,
wherein the meta-controller, the one or more DLCs, and the at least one SFC appear to an external device as a single cell switched domain.

18. The meta-controller as recited in claim 17, wherein the logic is further configured to cause the meta-controller to:
receive control packets destined for a physical port of a virtual switch;
route the received control packets to a VCD associated with the virtual switch which comprises the physical port;
receive route and configuration information from the more than one virtual switch; and
aggregate the route and configuration information for the more than one virtual switch.

19. The meta-controller as recited in claim 17, wherein the logic is further configured to cause the meta-controller to:
create virtual links between each of the more than one virtual switch to provide full-mesh connectivity between the more than one virtual switch, the full-mesh connectivity allowing control protocols in a VCD to have visibility to link up events to peer control protocols in another VCD;
map virtual instances to virtual resources to enable two or more virtual switches to share or have overlapping features;
allow more than one virtual switch to share a physical port of a DLC; and
manage conflicts due to the shared physical port.

20. The meta-controller as recited in claim 17, wherein the logic is further configured to cause the meta-controller to segregate the virtual switches into different groups according to a criterion, wherein virtual switches in different groups are devoid of a virtual link therebetween, and wherein the criterion is selected from the group consisting of: users, companies, customers, usage, uses, and cost.

* * * * *